United States Patent Office 2,879,279
Patented Mar. 24, 1959

2,879,279

PREPARATION OF UNSATURATED COMPOUNDS OF THE CYCLOPENTANOPOLYHYDROPHEN-ANTHRENE SERIES

Willem Jacob van der Burg, Oss, Netherlands, assignor to Organon Inc., Orange, N.J., a corporation of New Jersey No Drawing. Application September 24, 1957
Serial No. 685,828

Claims priority, application Netherlands
October 23, 1956

5 Claims. (Cl. 260—397.3)

The invention relates to a process for the preparation of unsaturated compounds of the cyclopentanopolyhydrophenanthrene series which have one or more double bonds in α-position relatively to a keto group and especially to the preparation of 3-keto compounds of this series which have a double bond in the positions 1-2 and/or 4-5, and of functional derivatives thereof. These compounds are of great importance, because in addition to adrenocortical hormones, they also comprise other substances with great biological activity, such e.g. as 1-dehydrohydrocortisone, 1-dehydrocortisone, 1-dehydroaldosterone, and their 2-alkyl and/or 9 and 12 halogen derivatives, and valuable intermediate products, such e.g. as $\Delta^{1,4}$-androstadiene-3-one-17-one or 17-ol.

The present invention relates to a process for the preparation of dehydro compounds of the cyclopentanopolyhydrophenanthrene series and is characterized in that into a keto compound of this series, saturated in at least one of the α-positions relatively to the keto group, at least one double bond is introduced in α-position relatively to the said keto group by treatment with an iodine compound chosen from the group consisting of periodic acid, iodic acid, iodine pentoxide and compounds capable of supplying these compounds during the reaction.

According to the process of the present invention there can be prepared e.g. $\Delta^4$-3-keto compounds, $\Delta^1$-5α-3-keto compounds, $\Delta^{1,4}$-3-keto compounds, and $\Delta^{1,4,6}$-3-keto compounds. The $\Delta^4$-3-keto compounds are formed from the 5β-3-ketones which are saturated in ring A, the $\Delta^1$-5α-3-keto compounds from the saturated 5α-3-ketones, while for the preparation of $\Delta^{1,4}$-3-keto compounds both the saturated 5β and 5α-3-ketones and also the $\Delta^4$ and the $\Delta^1$-3-ketones may be used.

Starting with 3-keto steroids entirely saturated in ring A, the present dehydrogenation reaction may yield, in addition to the desired dehydrogenation products, such as the $\Delta^1$, $\Delta^4$, and $\Delta^{1,4}$-3-keto steroids, as by-products the 2-iodine and 4-iodine compounds, of 3-keto-5α and 3-keto-5β steroids. In order to obtain a better yield of the desired unsaturated compounds, it is of advantage to treat these 2-iodine or 4-iodine compounds, if desired after isolation from the reaction medium, with hydrazine or a derivative thereof, such as phenylhydrazine, dinitrophenylhydrazine and semicarbazide, after which the formed product can be converted into the corresponding $\Delta^1$ or $\Delta^4$-3-keto steroids by acid hydrolysis or by an exchange reaction with a ketone, such as pyruvic acid, or with an aldehyde, such as benzaldehyde, hydroxybenzaldehyde and carboxybenzaldehyde.

The quantity of dehydrogenating agent which is used for the present reaction is dependent on the starting product, on the nature of the dehydrogenating agent, and on the reaction conditions, such as solvent and temperature at which the reaction is carried out. In general it may be said that at least one equivalent of dehydrogenating agent is applied for each double bond which has to be introduced.

The starting substances may have any steric configuration and may also occur as racemates; as examples are mentioned the 3-ketones of the compounds of the cholestane, spirostane, furostane, cholane, norcholane, bisnorcholane, pregnane, or androstane series. Also the 3-keto-18 and 19-nor compounds, as well as the 18,19-bisnor compounds and also the C-nor and D-homo steroids may be used as starting products. They may be saturated or contain double bonds e.g. in the positions 1 or 4, and also in the positions 5, 6, 7, 8, 9:11, 11, 14, 16 or 17, and contain further substituents, such as free or functionally converted oxy, oxo, oxymethyl, formyl, carboxyl, or oxalyl groups, alkyl, e.g. methyl groups, epoxy groups, or halogen atoms, e.g. in the positions 2, 4, 5, 6, 7, 8, 9, 10, 11, 12, 14, 15, 16, 17, 18, 19, 20 or 21.

Especially important starting substances are progesterone, 11-dehydroprogesterone, 11, 12, 14, 15, 16, 17, 18 or 19-oxy-progesterone, 11-desoxycorticosterone, cortisone, hydrocortisone, 11-epihydrocortisone, aldosterone, 18-oxycorticosterone, 11-epi-18-oxy-corticosterone, 17α-oxy-aldosterone, 18-oxy-hydrocortisone, 18-oxy and 18-oxocortisone, 18-oxy and 18-oxocortexone, 17α-oxy-cortexone, 17α,18-dioxycortexone, corresponding compounds which, instead of in 4-position, are unsaturated in 1-position or in the positions 4 and 6, e.g.:

$\Delta^{4,6}$-17α,21-dihydroxy-3,11,20-triketo-pregnadiene;
$\Delta^{4,6}$-11β,17α,21-trihydroxy-3,20-pregnadiene;
$\Delta^{4,6}$-11β,21-dihydroxy-3,20-diketo-pregnadiene;
$\Delta^{4,6}$-11β,21-dihydroxy-3,20-diketo-pregnadiene-18-al;
$\Delta^{4,6}$-11α,21-dihydroxy-3,20-diketo-pregnadiene;
$\Delta^{4,6}$ - 11β,17α,21 - trihydroxy - 9α - fluoro - 3,20 - diketo-pregnadiene;
$\Delta^{4,6}$ - 11β,17α,21 - trihydroxy - 9α - chloro - 3,20 - diketo-pregnadiene;
$\Delta^{4,6}$ - 11β,17α,21 - trihydroxy - 9α - bromo - 3,20 - diketo-pregnadiene;
$\Delta^{4,6}$ - 2 - methyl - 11β,17α,21 - trihydroxy - 3,20 - diketo-pregnadiene;
$\Delta^{4,6}$ - 2 - methyl - 11β,17α,21 - trihydroxy - 9 - halo- 3,20-diketo-pregnadiene;
$\Delta^{4,6}$ - 3,20 - diketo - 12α - fluoro - 11β,21 - dioxy - pregnadiene and functional derivatives of any of the aforesaid compounds.

If as starting product a compound is applied which contains several keto groups, it may be necessary to temporarily block a keto group inducing the introduction of a non-desired double bond in α-position.

If use is made of periodic acid it may be desirable, in case the starting substances are α-diols or α-ketols, to protect at least one of the two groups. A hydroxyl group is protected e.g., by esterification, a keto group e.g. by ketalization.

In the starting substances the hydroxyl groups may be functionally converted, i.e. may be esterified, e.g. with an aliphatic, aromatic, or heterocyclic carboxylic acid, e.g. acetic acid, trimethyl acetic acid, benzoic acid, or furane carboxylic acid, or may be etherified, e.g. to the tetrahydropyranyloxy, benzyloxy, or triphenylmethoxy groups. Functionally converted keto groups are preferably ketalized geto groups, e.g. derived from a bivalent alcohol, such as the ethylene dioxide groups.

The used dehydrogenating agents, periodic acid, iodic acid and iodine pentoxide, may be applied as such or in the form of a functional derivative, e.g. a salt. In the latter case it is necessary, in order to liberate the iodic or periodic acid, to add to the reaction mixture a strongly dissociated acid, e.g. a mineral acid. In addition to the said salts of iodic acid and periodic acid, such as potassium iodate and sodium periodate, there are still other compounds which, in a suitable reaction medium, can supply iodic acid and can consequently be applied as dehydrogenating agents. As examples thereof are mentioned the iodic oxides $I_2O_4$ and $I_4O_9$ and the salts of inorganic and organic acids, in which iodine occurs as trivalent cation, such as $IPO_4$, $I(JO_3)_3$, $I(NO_3)_3$, and $I(CH_3COO)_3$.

The dehydrogenation according to the present process is preferably carried out in an aqueous or non-aqueous polar organic solvent or in a mixture of a polar and a non-polar solvent. Preferably the reaction is carried out in the presence of an aliphatic carboxylic acid such as acetic acid and propionic acid or of a tertiary alcohol, such as tertiary butanol and tertiary amyl alcohol or of a N,N'-dialkylacylamide e.g. dimethyl formamide. Also the following solvents, especially mixed with the said alcohols, may be used: dioxane, glacial acetic acid, acetic acid anhydride, methanol, isopropanol, tetrahydrofurane, carbon tetrachloride, pyridine, ethyl acetate, acetonitrile, and mixtures of these solvents.

The reaction is accelerated by the presence of an inorganic or organic acid, preferably an organic acid, such as acetic acid, propionic acid, or benzoic acid. The organic acid, e.g. acetic acid, or propionic acid, may in some cases at the same time serve as a solvent for the reaction components.

Any excess of dehydrogenating agent can be removed e.g. by washing out with water or by reduction with sodium sulphite, sodium bisulphite, and the like, followed by washing out.

The purification of the reaction products can e.g. be carried out by chromatography, e.g. over aluminum oxide or silica gel, by distribution methods, e.g. according to the counter current method, or by separation by means of a Girard reagent, such as trimethyl amino acetic hydrazide or pyridine acetic acid hydrazide. Further to the purification or instead of it the products may be recrystallized from organic or aqueous organic solvents.

The reaction products, obtained according to the process may be converted into their functional derivatives by methods known per se, e.g. esters, ethers, enolesters, enolethers, ketals, thioethers and thioketals, and also hydrazones, oximes and enamines. In these compounds the hydroxyl and/or keto groups may be completely or partially functionally converted.

The following examples illustrate the invention.

*Example I*

To a solution of 0.6 g. of $\Delta^4$-17α,21-dihydroxy-3,11,20-triketopregnene-21-acetate in 30 ml. of tert. butanol and 2 ml. of glacial acetic acid 1.2 g. of periodic acid are added. Boiling is carried out under reflux for 30 minutes. Subsequently the reaction mixture is diluted with 30 ml. of water and 3 g. of sodium sulphite are added. The tert. butanol is removed in vacuo. Then extraction is carried out with chloroform. The combined extracts are washed with water, dried on $Na_2SO_4$. This extract is evaporated to dryness under reduced pressure and the residue is taken up in acetone. It yields crystals of the $\Delta^{1,4}$-17α21-dihydroxy-3,11,20-triketo-pregnadiene-21-acetate melting at 228–233° C., $(\alpha)_D = +190°$ (dioxane).

*Example II*

To a solution of 0.6 g. of $\Delta^4$-11β,17α,21-trihydroxy 3,20-diketopregnene-21-acetate in 32 ml. of dioxane are added 2.5 g. of benzoic acid and 1.2 g. of periodic acid. After boiling under nitrogen for 30 minutes the reaction mixture is processed as described in Example I. Obtained is the $\Delta^{1,4}$-11β,17α-21-trihydroxy-3,20-diketopregnadiene-21-acetate.

*Example III*

1 g. of $\Delta^4$-3,17-diketo-androstene is added to a mixture of 40 ml. of tert. butanol and 2 ml. of dimethyl formamide. While stirring the mixture is heated to 50° C. and 400 mg. of periodic acid are added. Then another 4 times 400 mg. of $HIO_4.2H_2O$ are added with intervals of 1 hour. Finally the reaction mixture is stirred at 50° C. for another 24 hours, then poured into a solution of 6 g. of sodium sulphite in 50 ml. of water. The tert. butanol is distilled off in vacuo and the aqueous residue is extracted with ether. The combined extracts are washed with water, dried on sodium sulphate, and evaporated to dryness in vacuo. 2 ml. of quinoline are added to the remaining colourless oil and the mixture is heated on a water-bath for 15 minutes. After cooling the molecular compound of $\Delta^{1,4}$-3,17-diketo-androstadiene crystallizes out with quinoline. This is sucked off and washed with little ether. The resulting molecular compound is suspended in 20 ml. of ether and this suspension is shaken with 20 ml. of 2 N sulphuric acid. The aqueous layer is then removed and the ether layer is washed with water till neutral, dried on sodium sulphate and evaporated to a small volume (2 or 3 ml.). The resulting $\Delta^{1,4}$-3,17-diketo androstadiene is colourless and melts at 139–140° C.

*Example IV*

1 g. of 3,17-diketoandrostane is added to 50 ml. of tert. butanol and the mixture is heated at 70° C. while stirring. Then 1.2 g. of potassium periodate in finely powdered form and 0.8 ml. of concentrated hydrochloric acid are added and stirred at 70° for 15 hours. After cooling the mixture is poured into a solution of 2 g. of $Na_2SO_3$ in 50 ml. of water. Then the greater part of the tert. butanol is removed by evaporation in vacuo. The resulting cloudy liquid is extracted a few times with ether. The collected extracts are washed with water and then dried on sodium sulphate.

From the ethereal solution evaporated to a small volume the $\Delta^1$-3,17-diketo-androstene crystallizes out which after recrystallization once from ether is pure.

Obtained is 0.8 g. with a m.p. of 137–138°.

Paper chromatographically traces of $\Delta^{1,4}$-3,17-diketoandrostadiene are still demonstrable in the mother-liquor of the crystallizate.

*Example V*

0.6 g. of 17α,21-dihydroxy-3,11,20-triketoallopregnane-21-acetate (m.p. 227–229°) is added to 40 ml. of tert. amylalcohol and 2 ml. of glacial acetic acid. 250 mg. of periodic acid are added after which the mixture is heated to 70°. Then another 4 times 250 mg. of periodic acid are added with intervals of 30 minutes, after which the mixture is heated at 70° for another 20 hours. The reaction mixture is processed as described in Example I. Obtained is the $\Delta^{1,4}$-17α,21-dihydroxy-3,11,20-triketopregnadiene-21-acetate melting at 228–232°.

*Example VI*

0.3 g. of $\Delta^1$-7α,21-dihydroxy-3,11,20-triketo-allo-pregnene-21-acetate and 0.9 g. of periodic acid are added to 15 ml. of tert. amylalcohol. 2.5 ml. of glacial acetic acid are added, after which the mixture is boiled under reflux for 3½ hours. After processing the reaction mixture it appears from the paper chromatogram that mainly $\Delta^{1,4}$-17α,21-dihydroxy-3,11,20-triketo-pregnadiene-21-acetate has formed.

*Example VII*

0.1 g. of $\Delta^{4,6}$-3,17-diketo-androstadiene is stirred at 70° C. for 16 hours with 0.5 ml. of concentrated hydrochloric acid and 200 mg. of sodium periodate and 10 ml. of tert. butanol. The process of the reaction mixture is carried out as described in Example I. Obtained are 60 mg. of $\Delta^{1,4,6}$-3,17-diketo-androstatriene. M.p. 166° C.; $(\alpha)_D = +72°$.

*Example VIII*

A mixture of 0.5 g. of $\Delta^{4,6}$-11β,17α,21-trihydroxy-3,20- diketopregnadiene-21-acetate and 900 mg. of periodic acid in 30 ml. of tert. butanol is stirred at 75° C. for 15 hours. The resulting reaction mixture is processed as described in Example I. Obtained is the $\Delta^{1,4,6}$-11$\beta$,17$\alpha$,21-trihydroxy-3,20-diketopregnatriene-21-acetate. In the same manner the $\Delta^{1,4,6}$-17$\alpha$, 21-dihydroxy-9-halo-3,11,20-triketo-pregnatrienes and the $\Delta^{1,4,6}$-11$\beta$,17$\alpha$,21-trihydroxy-9$\alpha$-halo-3,20-diketo-pregnatrienes can be prepared starting from the corresponding $\Delta^{4,6}$-3,ketones.

Example IX 0.3 g. of $\Delta^4$-9$\alpha$-fluoro-11$\beta$,17$\alpha$,21-trihydroxy-3,20,diketopregnene-21-acetate is dissolved in 15 ml. of tert. butanol and 1 ml. of propionic acid. Added is 0.7 g. of periodic acid, after which the mixture is kept at 80° for 20 hours (under nitrogen). The process is carried out as described in Example I. Obtained is the $\Delta^{1,4}$-9$\alpha$-fluoro-11$\beta$,17$\alpha$,21-trihydroxy-3,20-diketopregnadiene-21-acetate, m.p. 239° C.

Example X 1.5 g. of iodine pentoxide are added to a solution of 1 g. of $\Delta^4$-17$\alpha$,21-dihydroxy-3,11,20-triketopregnene-21-acetate in 5 ml. of glacial acetic acid. The mixture is stirred at 70° C. for 8 hours. Subsequently the reaction mixture is diluted with 80 ml. of water and extracted with chloroform. The extract coloured purple by iodine is shaken with a dilute solution of sodium sulphite in water until the purple colour has disappeared, then washed with ice cold 1 N sodium hydroxide solution, and finally with water till neutral. After drying on anhydrous sodium sulphate the extract is evaporated to dryness. Crystallization from acetone yields the $\Delta^{1,4}$-17$\alpha$,21-dihydroxy-3,11,20-triketopregnadiene-21-acetate melting at 229–233° C. ($\alpha$)$_D$= +190° (dioxane).

Example XI 0.6 g. of $\Delta^4$-11$\beta$,17$\alpha$,21-trihydroxy-3,20-diketopregnene-21-acetate is brought into a mixture of 30 ml. of tetrahydrofurane and 5 ml. of propionic acid. 1 g. of $I_2O_5$ and two drops of water are added. After stirring for 48 hours at 50° C. the reaction mixture is processed as described in Example X. Crystallization from acetone yields the 21-acetate of $\Delta^{1,4}$-11$\beta$,17$\alpha$,21-trihydroxy-3,20-diketo-pregnadiene melting at 237° C.

Example XII 0.2 g. of 11$^0$,17$\alpha$,21-trihydroxy-3,20-diketopregnane-21-acetate (melting-point 215–216°) and 0.2 g. of iodic acid are stirred under nitrogen at 90° C. for 90 minutes together with 10 ml. of propionic acid. After processing the $\Delta^4$-11$\beta$,17$\alpha$,21-trihydroxy-3,20-diketopregnene-21-acetate melting at 221–222° C. is obtained.

Example XIII 1 g. of 3,17-diketo-androstane is brought into 10 ml. of tertiary amyl alcohol and the mixture is heated to 70° C. while stirring. Then 1.2 g. of sodium iodate in a powdered form and 0.9 ml. of concentrated hydrochloric acid are added and stirred at 70° C. for 17 hours.

After cooling the mixture is poured into a solution of 2 g. of sodium sulphite in 50 ml. of water. The tertiary amyl alcohol is removed for the greater part by evaporating in vacuo. The resulting liquid is extracted a few times with ether. The collected extracts are subsequently washed with water and then dried on sodium sulphate. The ethereal solution is evaporated to 15 ml., after which herefrom the $\Delta^1$-3,17-diketo-androstene with melting-point 137–138° C. is obtained.

Paper chromatographically the $\Delta^{1,4}$-3,17-diketo-androstadiene and the $\Delta^4$-3,17 diketo-androstene have been demonstrated in the mother-liquor of the crystallisate.

Example XIV 2 g. of 17$\alpha$,21-dihydroxy-3,11,20-triketo-pregnane-21-acetate and 1.5 g. of iodine iodate ($I(IO_3)_3$) are brought into 5 ml. of tertiary butanol. The mixture is stirred at a temperature of 70° C. for 15 minutes. Then, in a period of 20 minutes, a mixture of 1 ml. of water and 5 ml. of tertiary butanol is added dropwise. Then heating at 70° C. is continued for another 6 hours. The cooled reaction mixture is processed as described in Example XIII.

Obtained is the $\Delta^4$-17$\alpha$,21-dihydroxy-3,11,20-triketo-pregnene-21-acetate with a melting-point of 238–240° C.

Example XV 0.6 g. of 11$\beta$,17$\alpha$,21-trihydroxy-3,20-diketo-pregnane-21-acetate and 1 g. of iodic acid are brought into 6 ml. of 90% acetic acid. The mixture is heated at 65° C. for 15 hours. The product isolated from the reaction mixture is recrystallized from acetone. Obtained is the $\Delta^{1,4}$-11$\beta$,17$\alpha$,21-trihydroxy-3,20-diketo-pregnadiene-21-acetate with a melting-point of 236–237° C.

Example XVI 1 g. of 17$\alpha$,21-dihydroxy-3, 11, 20-triketo-pregnane-21-acetate is brought into 10 ml. of tertiary butanol. Then 1.5 g. of iodine triacetate and 0.5 ml. of water are added. The mixture is stirred at a temperature of 70° C. for 15 hours and then processed, as described in Example XIII, in which the $\Delta^4$-17$\alpha$,21-dihydroxy-3,11,20-triketo-pregnene-21-acetate with a melting-point of 238–241° C. is obtained.

Example XVII

A suspension of 0.5 g. of $\Delta^{4,6}$-17$\alpha$,21-dihydroxy-3,11,20-triketo-pregnadiene-21-acetate and 1 g. of iodine pentoxide in a mixture of 5 ml. of tertiary amyl alcohol and 5 ml. of glacial acetic acid are heated, while stirring, at 70° C. under nitrogen for 15 hours. The process of the reaction mixture is carried out as described in Example X.

Obtained is the $\Delta^{1,4,6}$-17$\alpha$,21-dihydroxy-3,11,20-triketo-pregnatriene-21-acetate with a melting-point of 223–225° C.

Example XVIII 0.3 g. of $\Delta^1$-17$\alpha$,21-dihydroxy-3,11,20-triketo-allopregnene-21-acetate and 0.5 g. of iodic acid are brought into 10 ml. of tertiary butanol. To this is added 0.2 ml. of water, after which the mixture is heated, while stirring, at 70° C. for 15 hours. After processing the reaction mixture, as described in Example X, the $\Delta^{1,4}$-17$\alpha$,21-dihydroxy-3,11,20-triketo-pregnadiene-21-acetate is obtained.

Example XIX

A mixture of 0.5 g. of $\Delta^{4,6}$-11$\beta$,17$\alpha$,21-trihydroxy-3,20-diketo-pregnadiene-21-acetate and 900 mg. of iodic acid in 10 ml. of tertiary butanol are stirred at 75° C. for 20 hours. The reaction mixture is processed as described in Example X. Obtained is the $\Delta^{1,4,6}$-11$\beta$,17$\alpha$,21-trihydroxy-3,20-diketo-pregnatriene-21-acetate. In the same manner, starting from the corresponding $\Delta^{4,6}$-3-ketones, are prepared the $\Delta^{1,4,6}$-17$\alpha$,21-dihydroxy-9-halo-3,11,20-triketo-pregnatrienes and the $\Delta^{1,4,6}$ - 11$\beta$,17$\alpha$,21 - trihydroxy - 9$\alpha$ - halo-3,20-diketo-pregatrienes.

Example XX 0.5 g. of 17$\alpha$,21-dihydroxy-3,11,20-triketo-allopregnane-21-acetate (melting-point 227–229°) is brought into 5 ml. of glacial acetic acid. Added is 0.8 g. of iodic acid. The mixture is stirred intensively at a temperature of 70° C. for 18 hours. After cooling the reaction mixture is poured into water and further processed as described in Example X.

Obtained is the $\Delta^{1,4}$-17$\alpha$,21-dihydroxy-3,11,20-triketo-pregnadiene-21-acetate melting at 228–232° C.

I claim:

1. A process which comprises reacting a 3-keto compound selected from the group consisting of steroids of androstane and pregnane series, which compound is saturated in at least one of the positions 1-2 and 4-5, with a compound selected from the group consisting of periodic acid and iodic acid to effect the introduction of at least one double bond in α-position relative to said 3-keto group.

2. Process according to claim 1, in which the reaction is carried out in the presence of an acid.

3. Process according to claim 1, in which the reaction is carried out in a solvent chosen from the group consisting of a lower tertiary alcohol, a lower aliphatic carboxylic acid and a N,N'-di-lower alkyl acylamide.

4. Process according to claim 3, in which tert-butanol is used as a solvent.

5. Process according to claim 3, in which dimethyl formamide is used as a solvent.

No references cited.